United States Patent
Harada et al.

(10) Patent No.: US 8,062,747 B2
(45) Date of Patent: Nov. 22, 2011

(54) FLAME RETARDANT FLEXIBLE THERMOPLASTIC COMPOSITION, METHOD OF MAKING, AND ARTICLES THEREOF

(75) Inventors: Tamotsu Harada, Fukushima (JP); Vijay Rajamani, Slingerlands, NY (US); Sho Sato, Utsunomiya (JP); Xiangyang Tai, Utsunomiya (JP); Weiguang Yao, Moka (JP)

(73) Assignee: Sabic Innovative Plastics IP B.V. (NL)

( * ) Notice: Subject to any disclaimer, the term of this patent is extended or adjusted under 35 U.S.C. 154(b) by 856 days.

(21) Appl. No.: 11/613,234

(22) Filed: Dec. 20, 2006

(65) Prior Publication Data

US 2007/0264888 A1 Nov. 15, 2007

Related U.S. Application Data

(60) Provisional application No. 60/755,220, filed on Dec. 30, 2005.

(51) Int. Cl.
*H01B 7/16* (2006.01)
*C08K 3/22* (2006.01)
*C08L 53/02* (2006.01)

(52) U.S. Cl. ......... 428/379; 524/436; 524/505; 524/508

(58) Field of Classification Search ............... 524/436, 524/505, 508; 428/379
See application file for complete search history.

(56) References Cited

U.S. PATENT DOCUMENTS

| | | |
|---|---|---|
| 2,933,480 A | 4/1960 | Gresham et al. |
| 3,093,621 A | 6/1963 | Gladding |
| 3,211,709 A | 10/1965 | Ademek et al. |
| 3,646,168 A | 2/1972 | Barrett |
| 3,790,519 A | 2/1974 | Wahlborg |
| 3,884,993 A | 5/1975 | Gros |
| 3,894,999 A | 7/1975 | Boozer |
| 4,059,654 A | 11/1977 | Von Bodungen et al. |
| 4,098,762 A | 7/1978 | Miyata et al. |
| 4,166,055 A | 8/1979 | Lee, Jr. |
| 4,584,334 A | 4/1986 | Lee, Jr. et al. |
| 4,760,118 A | 7/1988 | White et al. |
| 4,962,148 A * | 10/1990 | Orikasa et al. ............... 524/504 |
| 4,990,558 A | 2/1991 | DeNicola, Jr. et al. |
| 5,258,455 A | 11/1993 | Laughner et al. |
| 5,424,360 A * | 6/1995 | Nagaoka et al. ............... 525/66 |
| 6,011,086 A | 1/2000 | Grant et al. |
| 6,306,978 B1 | 10/2001 | Braat et al. |
| 6,894,101 B2 | 5/2005 | Paul et al. |
| 2003/0148116 A1* | 8/2003 | Adedeji et al. ............... 428/441 |

FOREIGN PATENT DOCUMENTS

EP 115712 A1 * 8/1984

(Continued)

OTHER PUBLICATIONS

Derwent abstract Acc. No. 1992-085304 for JP 04-028737 A, Jan. 31, 1992.*
Full English-language translation of JP 04-028737 A, Jan. 31, 1992.*
ASTMD790, Standard Test Methods for Flexural Properties of Unreinforced and Reinforced Plastics and Electrical Insulating Materials, 11 pages, Apr. 2003.

(Continued)

*Primary Examiner* — Vickey Nerangis
(74) *Attorney, Agent, or Firm* — Cantor Colburn LLP

(57) ABSTRACT

A flexible thermoplastic composition includes among its components: (i) a poly(arylene ether); (iii) a polymeric compatibilizer; (iv) a polyolefin comprising a functional group; and (iv) magnesium dihydroxide. The flexible thermoplastic composition may be used for making electrical wires.

26 Claims, 1 Drawing Sheet

FOREIGN PATENT DOCUMENTS

| | | | | |
|---|---|---|---|---|
| JP | 63128021 | A | * | 5/1988 |
| JP | 04028737 | A | * | 1/1992 |
| JP | 2005113006 | A | | 4/2005 |
| WO | 2005097900 | | | 10/2005 |

OTHER PUBLICATIONS

ISO 6722, Road Vehicles—60 V and 600 V single-core cables—Dimensions, test methods and requirements, Dec. 15, 2002, 40 pages.

* cited by examiner

US 8,062,747 B2

FLAME RETARDANT FLEXIBLE THERMOPLASTIC COMPOSITION, METHOD OF MAKING, AND ARTICLES THEREOF

CROSS REFERENCE TO RELATED APPLICATIONS

This application claims priority to U.S. Provisional Patent Application Ser. No. 60/755,220 filed on Dec. 30, 2005, which is incorporated by reference herein in its entirety.

BACKGROUND OF INVENTION

Flexible plastic materials are used in a wide range of articles including electrical wire. In some articles the plastic materials are required to be flame retardant. Flexible plastic materials have been made flame retardant through the use of flame retardant additives (usually referred to as flame retardants). Initially the most common flame retardants contained halogens but use of halogen containing flame retardants has fallen out of favor due to, at least in part, concerns over their environmental impact. In some plastic materials, halogen containing flame retardants have been replaced by phosphate containing flame retardants, particularly organophosphate esters. However, as our understanding of complex environmental relationships increases there is some evolving concern with regard to the environmental impact of phosphorous containing flame retardants. Accordingly, there is an increasing desire for plastic materials that use non-phosphorous, non-halogen flame retardants.

Accordingly, there exists a need for fire retardant flexible polymer materials that employ non-phosphorous, non-halogen flame retardants.

BRIEF DESCRIPTION OF THE INVENTION

The above described need is met by a thermoplastic composition. The thermoplastic composition comprises: (i) a poly(arylene ether); (ii) a polymeric compatibilizer; (iii) a polyolefin comprising a functional group selected from the group consisting of epoxy, carboxyl, and an acid anhydride groups; and (iv) magnesium dihydroxide. The thermoplastic composition may further comprise an additional polyolefin.

In another embodiment, an electrical wire comprises: a conductor; and a covering disposed over the conductor. The covering comprises a thermoplastic composition. The thermoplastic composition comprises: (i) a poly(arylene ether); (ii) a polymeric compatibilizer; (iii) a polyolefin comprising a functional group selected from the group consisting of epoxy, carboxyl, and an acid anhydride groups; and (iv) a magnesium dihydroxide. The thermoplastic composition may further comprise an additional polyolefin.

DETAILED DESCRIPTION

Figure 1:
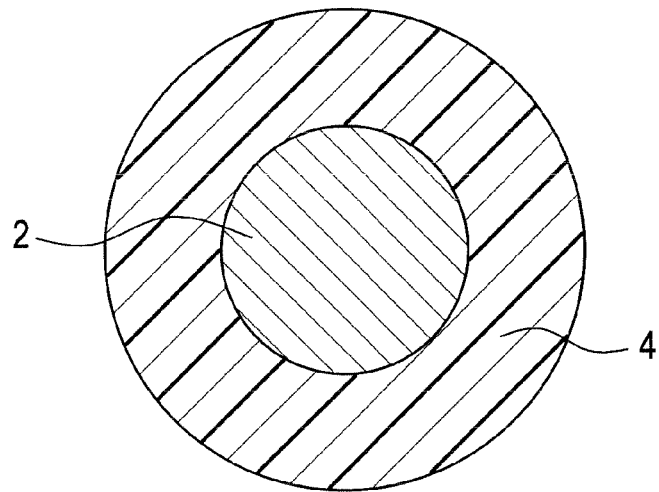
FIG. 1 is a schematic representation of a cross-section of an electrical wire.

The inclusion of a polyolefin comprising a functional group selected from the group consisting of epoxy, carboxyl, and an acid anhydride groups in a thermoplastic composition comprising a magnesium dihydroxide, a poly(arylene ether), a polymeric compatibilizer, and an optional additional polyolefin has the unexpected effect of significantly improving the flame retardance of the composition without increasing the amount of magnesium dihydroxide. This is surprising because the same effect is not seen in compositions free of poly(arylene ether) or in compositions that employ a different metal hydroxide. For simplicity, a polyolefin comprising a functional group selected from the group consisting of epoxy, carboxyl, and an acid anhydride groups will frequently be referred to herein as a functionalized polyolefin.

The thermoplastic composition(s) described herein comprises at least two phases, a polyolefin phase and a poly(arylene ether) phase. The polyolefin phase is continuous. In some embodiments, the poly(arylene ether) phase is dispersed within the polyolefin phase. Good compatibilization between the phases can result in improved physical properties including higher impact strength at low temperatures and room temperature, better heat aging, better flame retardance, as well as greater tensile elongation. It is generally accepted that the morphology of the composition is indicative of the degree or quality of compatibilization. Small, relatively uniformly sized particles of poly(arylene ether) evenly distributed throughout an area of the composition are indicative of good compatibilization.

In some embodiments, the thermoplastic composition(s) described herein are essentially free of an alkenyl aromatic resin such as polystyrene or rubber-modified polystyrene (also known as high impact polystyrene or HIPS). Essentially free is defined as containing less than 10 weight percent (wt %), or, more specifically less than 7 wt %, or, more specifically less than 5 wt %, or, even more specifically less than 3 wt % of an alkenyl aromatic resin, based on the combined weight of poly(arylene ether), polyolefin and block copolymer(s). In some embodiments, the composition is completely free of an alkenyl aromatic resin. Surprisingly the presence of the alkenyl aromatic resin can negatively affect the compatibilization between the poly(arylene ether) phase and the polyolefin phase.

In some embodiments, the composition has a flexural modulus of 2,000 to less than 18000 kilograms/square centimeter (kg/cm$^2$) (200 to less than 1800 Megapascals (MPa)). Within this range the flexural modulus may be greater than or equal to 3,000 kg/cm$^2$ (300 Mpa), or, more specifically, greater than or equal to 4,000 kg/cm$^2$ (400 Mpa). Also within this range the flexural modulus may be less than or equal to 17,000 kg/cm$^2$ (1,700 Mpa), or, more specifically, less than or equal to 16,000 kg/cm$^2$ (1,600 Mpa). Flexural modulus, as described herein, is determined using ASTM D790-03 and a speed of 1.27 millimeters per minute. The flexural modulus values are the average of three samples. The samples for flexural modulus are formed using an injection pressure of 600-700 kilograms-force per square centimeter and a hold time of 15 to 20 seconds on a Plastar Ti-80G$_2$ from Toyo Machinery & Metal Co. LTD. The remaining molding conditions are shown in Table 1.

TABLE 1

| | |
|---|---|
| Drying temperature (° C.) | 80 |
| Dry time in hours | 4 |
| Cylinder temperature (° C.) | |
| Zone 1 | 240 |
| Zone 2 | 250 |
| Zone 3 | 260 |
| Zone 4 | 260 |
| Die Head | 260 |
| Mold temperature (° C.) | 80 |

In some embodiments the electrical wire meets or exceeds the flame retardance requirements of ISO 6722. Additionally, the electrical wire can meet or exceed the ISO 6722 requirements for one or more of the following: fluid compatibility, hot water resistance, abrasion, short term heat aging for classes A, B, or C, long term heat aging for classes A, B, or C, thermal overload for classes A, B, or C, and environmental cycling.

Poly(arylene ether) comprises repeating structural units of formula (I)

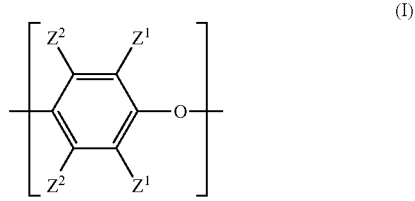

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) can be in the form of a homopolymer; a copolymer; a graft copolymer; an ionomer; or a block copolymer; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units.

The poly(arylene ether) can be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

In some embodiments, the poly(arylene ether) comprises a capped poly(arylene ether). The terminal hydroxy groups may be capped with a capping agent via an acylation reaction, for example. The capping agent chosen is preferably one that results in a less reactive poly(arylene ether) thereby reducing or preventing crosslinking of the polymer chains and the formation of gels or black specks during processing at elevated temperatures. Suitable capping agents include, for example, esters of salicylic acid, anthranilic acid, or a substituted derivative thereof, and the like; esters of salicylic acid, and especially salicylic carbonate and linear polysalicylates, are preferred. As used herein, the term "ester of salicylic acid" includes compounds in which the carboxy group, the hydroxy group, or both have been esterified. Suitable salicylates include, for example, aryl salicylates such as phenyl salicylate, acetylsalicylic acid, salicylic carbonate, and polysalicylates, including both linear polysalicylates and cyclic compounds such as disalicylide and trisalicylide. In one embodiment the capping agents are selected from salicylic carbonate and the polysalicylates, especially linear polysalicylates, and combinations comprising one of the foregoing. Exemplary capped poly(arylene ether) and their preparation are described in U.S. Pat. No. 4,760,118 to White et al. and U.S. Pat. No. 6,306,978 to Braat et al.

Capping poly(arylene ether) with polysalicylate is also believed to reduce the amount of aminoalkyl terminated groups present in the poly(arylene ether) chain. The aminoalkyl groups are the result of oxidative coupling reactions that employ amines in the process to produce the poly(arylene ether). The aminoalkyl group, ortho to the terminal hydroxy group of the poly(arylene ether), can be susceptible to decomposition at high temperatures. The decomposition is believed to result in the regeneration of primary or secondary amine and the production of a quinone methide end group, which may in turn generate a 2,6-dialkyl-1-hydroxyphenyl end group. Capping of poly(arylene ether) containing aminoalkyl groups with polysalicylate is believed to remove such amino groups to result in a capped terminal hydroxy group of the polymer chain and the formation of 2-hydroxy-N,N-alkyl-benzamine (salicylamide). The removal of the amino group and the capping provides a poly(arylene ether) that is more stable to high temperatures, thereby resulting in fewer degradative products during processing of the poly(arylene ether).

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s has an initial intrinsic viscosity greater than or equal to 0.25 dl/g, as measured in chloroform at 25° C. Initial intrinsic viscosity is defined as the intrinsic viscosity of the poly(arylene ether) prior to melt mixing with the other components of the composition and final intrinsic viscosity is defined as the intrinsic viscosity of the poly(arylene ether) after melt mixing with the other components of the composition. As understood by one of ordinary skill in the art the viscosity of the poly(arylene ether) may be up to 30% higher after melt mixing. The percentage of increase can be calculated by (final intrinsic viscosity—initial intrinsic viscosity)/initial intrinsic viscosity.

Determining an exact ratio, when two initial intrinsic viscosities are used, will depend somewhat on the exact intrinsic viscosities of the poly(arylene ether) used and the ultimate physical properties that are desired.

The poly(arylene ether) used to make the thermoplastic composition can be substantially free of visible particulate impurities. In some embodiments, the poly(arylene ether) is substantially free of particulate impurities greater than 15 micrometers in diameter. As used herein, the term "substantially free of visible particulate impurities" when applied to poly(arylene ether) means that a ten gram sample of a poly(arylene ether) dissolved in fifty milliliters of chloroform ($CHCl_3$) exhibits fewer than 5 visible specks when viewed in a light box with the naked eye. Particles visible to the naked eye are typically those greater than 40 micrometers in diameter. As used herein, the term "substantially free of particulate impurities greater than 15 micrometers" means that of a forty gram sample of poly(arylene ether) dissolved in 400 milliliters of $CHCl_3$, the number of particulates per gram having a size of 15 micrometers is less than 50, as measured by a Pacific Instruments ABS2 analyzer based on the average of five samples of twenty milliliter quantities of the dissolved polymeric material that is allowed to flow through the analyzer at a flow rate of one milliliter per minute (plus or minus five percent).

The thermoplastic composition comprises the poly(arylene ether) in an amount of 25 to 60 weight percent (wt %), with respect to the total weight of the composition. Within this range the amount of poly(arylene ether) may be greater than or equal to 30 wt %, or, more specifically, greater than or equal to 35 wt %, or, even more specifically, greater than or equal to 45 wt %. Also within this range the amount of poly(arylene ether) may be less than or equal to 55 wt %.

The functionalized polyolefin is not limited to any particular species, and can be any polyolefin described above which has been copolymerized or grafted with an unsaturated monomer comprising epoxy, carboxyl, or an acid anhydride group.

Exemplary epoxy-containing unsaturated monomers include glycidyl methacrylate, butylglycidyl malate, butylglycidyl fumarate, propylglycidyl malate, glycidyl acrylate, N-[4-(2,3-epoxypropoxy)-3,5-dimethylbenzyl]-acrylamide, and combinations comprising one or more of the foregoing. Exemplary carboxyl-containing unsaturated monomers include acrylic acid, methacrylic acid, maleic acid, and combinations comprising one of the foregoing. Exemplary unsaturated monomers containing an acid anhydride group are maleic anhydride, itaconic anhydride, citraconic anhydride, and combinations comprising one of the foregoing. In some embodiments the monomer comprises maleic anhydride.

The functionalized polyolefin can be made by methods known in the art. Exemplary means include melt mixing the polyolefin resin and the unsaturated monomer, for example in a twin screw extruder or a Banbury mixer, in the presence or absence of a radical initiator, and copolymerization of the polyolefin monomer with the unsaturated monomer. As is commonly understood the functionalized polyolefin can comprise both functionalized and unfunctionalized polymer chains. The average content of the functional groups resulting from the unsaturated monomer can be, for example, 0.1 to 5 weight percent based on the total weight of the functionalized polyolefin.

Polyolefins are of the general structure $C_nH_{2n}$, and include polyethylene, polypropylene and polyisobutylene. Exemplary homopolymers include polyethylene, LLDPE (linear low density polyethylene), HDPE (high density polyethylene) and MDPE (medium density polyethylene) and isotatic polypropylene. Polyolefin resins of this general structure and methods for their preparation are well known in the art and are described for example in U.S. Pat. Nos. 2,933,480, 3,093,621, 3,211,709, 3,646,168, 3,790,519, 3,884,993, 3,894,999, 4,059,654, 4,166,055 and 4,584,334. In some embodiments the polyethylene is at least partially crosslinked using one or more methods known in the art.

Copolymers of polyolefins may also be used such as copolymers of ethylene and alpha olefins like propylene, butylene, octene, and 4-methylpentene-1 as well as copolymers of ethylene and one or more rubbers and copolymers of propylene and one or more rubbers. Copolymers of ethylene and $C_3$-$C_{10}$ monoolefins and non-conjugated dienes, herein referred to as EPDM copolymers, are also suitable. Examples of suitable $C_3$-$C_{10}$ monoolefins for EPDM copolymers include propylene, 1-butene, 2-butene, 1-pentene, 2-pentene, 1-hexene, 2-hexene and 3-hexene. Suitable dienes include 1,4 hexadiene and monocylic and polycyclic dienes. Mole ratios of ethylene to other $C_3$-$C_{10}$ monoolefin monomers can range from 95:5 to 5:95 with diene units being present in the amount of from 0.1 to 10 mol %. EPDM copolymers can be functionalized with an acyl group or electrophilic group for grafting onto the poly(arylene ether) as disclosed in U.S. Pat. No. 5,258,455.

The polyolefin can comprise a single homopolymer, a combination of homopolymers, a single copolymer, a combination of copolymers or a combination comprising a homopolymer and a copolymer.

In some embodiments the polyolefin is selected from the group consisting of polypropylene, high density polyethylene and combinations of polypropylene and high density polyethylene. The polypropylene can be homopolypropylene or a polypropylene copolymer. Copolymers of polypropylene and rubber or block copolymers are sometimes referred to as impact modified polypropylene. Such copolymers are typically heterophasic and have sufficiently long sections of each component to have both amorphous and crystalline phases. Additionally the polypropylene may comprise a combination of homopolymer and copolymer, a combination of homopolymers having different melting temperatures, or a combination of homopolymers having different melt flow rates.

In some embodiments the polypropylene comprises a crystalline polypropylene such as isotactic polypropylene. Crystalline polypropylenes are defined as polypropylenes having a crystallinity content greater than or equal to 20%, or, more specifically, greater than or equal to 25%, or, even more specifically, greater than or equal to 30%. Crystallinity may be determined by differential scanning calorimetry (DSC).

In some embodiments the polypropylene has a melting temperature greater than or equal to 134° C., or, more specifically, greater than or equal to 140° C., or, even more specifically, greater than or equal to 145° C.

The polypropylene can have a melt flow rate (MFR) greater than 0.2 grams per 10 minutes and less than or equal to 15 grams per ten minutes (g/10 min). Within this range the melt flow rate may be greater than or equal to 0.4 g/10 min. Also within this range the melt flow rate may be less than or equal to 10, or, more specifically, less than or equal to 6, or, more specifically, less than or equal to 5 g/10 min. Melt flow rate can be determined according to ASTM D1238 using either powdered or pelletized polypropylene, a load of 2.16 kilograms and a temperature of 230° C.

The high density polyethylene can be homo polyethylene or a polyethylene copolymer. Additionally the high density polyethylene may comprise a combination of homopolymer and copolymer, a combination of homopolymers having different melting temperatures, or a combination of homopolymers having a different melt flow rate and generally having a density of 0.941 to 0.965 g/cm³.

In some embodiments the high density polyethylene has a melting temperature greater than or equal to 124° C., or, more specifically, greater than or equal to 126° C., or, even more specifically, greater than or equal to 128° C.

The high density polyethylene has a melt flow rate (MFR) greater than or equal to 0.01 grams per 10 minutes and less than or equal to 15 grams per ten minutes (g/10 min). Within this range the melt flow rate may be greater than or equal to 0.03 g/10 min. Also within this range the melt flow rate may be less than or equal to 10, or, more specifically, less than or equal to 6, or, more specifically, less than or equal to 5 g/10 min. Melt flow rate can be determined according to ASTM D1238 using either powdered or pelletized polyethylene, a load of 2.16 kilograms and a temperature of 190° C. In some embodiments the high density polyethylene is at least partially crosslinked.

In some embodiments the composition further comprises an additional polyolefin. The additional polyolefin can comprise any of the aforementioned types of polyolefin. The additional polyolefin can be unfunctionalized. Unfunctionalized polyolefin is one which ahs not been copolymerized or grafted with an unsaturated monomer.

The composition can comprise the functionalized polyolefin in an amount of 15 to 40 weight percent (wt %), with respect to the total weight of the composition. Within this range the amount of polyolefin may be greater than or equal to 17 wt %, or, more specifically, greater than or equal to 20 wt %. Also within this range the amount of polyolefin may be less than or equal to 38 wt %, or, more specifically, less than or equal to 35 wt %.

When the composition comprises a combination of additional polyolefin and the functionalized polyolefin the combined polyolefin is present in an amount of 15 to 40 weight percent (wt %), with respect to the total weight of the composition. Within this range the amount of polyolefin may be greater than or equal to 17 wt %, or, more specifically, greater than or equal to 20 wt %. Also within this range the amount of polyolefin may be less than or equal to 38 wt %, or, more specifically, less than or equal to 35 wt %, or, even more specifically, less than or equal to 30 wt %.

The amount of functionalized polyolefin relative to the combined amount of additional polyolefin and functionalized polyolefin is 5 wt % to 95 wt %. Within this range the amount of functionalized polyolefin may be greater than or equal to 8 wt %, or, more specifically, greater than or equal to 10 wt %. Also within this range the amount of functionalized polyolefin may be less than or equal to 70 wt %, or, more specifically, less than or equal to 50 wt %.

In some embodiments the polyolefin is a high density polyethylene (HDPE) and the functionalized polyolefin is a high density polyethylene functionalized with maleic anhydride.

In some embodiments the combined amount of polyolefin and functionalized polyolefin is less than the amount of poly(arylene ether) by weight.

In some embodiments, the weight ratio of the combined amount of functionalized polyolefin and polyolefin to poly(arylene ether) is 60/40 to 30/70, or, more specifically, 50/50 to 30/70, or, even more specifically, 39/61 to 30/70.

Polymeric compatibilizers are resins and additives that improve the compatibility between the polyolefin phase and the poly(arylene ether) phase. Polymeric compatibilizers include block copolymers, polypropylene-polystyrene graft copolymers and combinations of block copolymers and polypropylene-polystyrene graft copolymers as described below.

As used herein and throughout the specification "block copolymer" refers to a single block copolymer or a combination of block copolymers. The block copolymer comprises at least one block (A) comprising repeating aryl alkylene units and at least one block (B) comprising repeating alkylene units. The arrangement of blocks (A) and (B) may be a linear structure or a so-called radial teleblock structure having branched chains. A-B-A triblock copolymers have two blocks A comprising repeating aryl alkylene units. The pendant aryl moiety of the aryl alkylene units may be monocyclic or polycyclic and may have a substituent at any available position on the cyclic portion. Suitable substituents include alkyl groups having 1 to 4 carbons. An exemplary aryl alkylene unit is phenylethylene, which is shown in Formula II:

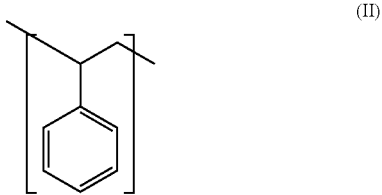

(II)

Block A may further comprise alkylene units having 2 to 15 carbons as long as the quantity of aryl alkylene units exceeds the quantity of alkylene units.

Block B comprises repeating alkylene units having 2 to 15 carbons such as ethylene, propylene, butylene or combinations of two or more of the foregoing. Block B may further comprise aryl alkylene units as long as the quantity of alkylene units exceeds the quantity of aryl alkylene units.

Each occurrence of block A may have a molecular weight which is the same or different than other occurrences of block A. Similarly each occurrence of block B may have a molecular weight which is the same or different than other occurrences of block B. The block copolymer may be functionalized by reaction with an alpha-beta unsaturated carboxylic acid.

In some embodiments, the B block comprises a copolymer of aryl alkylene units and alkylene units having 2 to 15 carbons such as ethylene, propylene, butylene or combinations of two or more of the foregoing. The B block may further comprise some unsaturated non-aromatic carbon-carbon bonds.

The B block may be a controlled distribution copolymer. As used herein "controlled distribution" is defined as referring to a molecular structure lacking well-defined blocks of either monomer, with "runs" of any given single monomer attaining a maximum number average of 20 units as shown by either the presence of only a single glass transition temperature (Tg), intermediate between the Tg of either homopolymer, or as shown via proton nuclear magnetic resonance methods. When the B block comprises a controlled distribution copolymer, each A block may have an average molecular weight of 3,000 to 60,000 g/mol and each B block may have an average molecular weight of 30,000 to 300,000 g/mol, as determined using light scattering techniques. When the B block is a controlled distribution polymer, each B block comprises at least one terminal region adjacent to an A block that is rich in alkylene units and a region not adjacent to the A block that is rich in aryl alkylene units. The total amount of aryl alkylene units is 15 to 75 weight percent, based on the total weight of the block copolymer. The weight ratio of alkylene units to aryl alkylene units in the B block may be 5:1 to 1:2. Exemplary block copolymers are further disclosed in U.S. Patent Application No. 2003/181584 and are commercially available from Kraton Polymers under the trademark KRATON. Exemplary grades are A-RP6936 and A-RP6935.

The repeating aryl alkylene units result from the polymerization of aryl alkylene monomers such as styrene. The repeating alkylene units result from the hydrogenation of repeating unsaturated units derived from a diene such as butadiene. The butadiene may comprise 1,4-butadiene and/or 1,2-butadiene. The B block may further comprise some unsaturated non-aromatic carbon-carbon bonds.

Exemplary block copolymers include polyphenylethylene-poly(ethylene/propylene)-polyphenylethylene (sometimes referred to as polystyrene-poly(ethylene/propylene)-polystyrene) and polyphenylethylene-poly(ethylene/butylene)-polyphenylethylene (sometimes referred to as polystyrene-poly(ethylene/butylene)-polystyrene).

In some embodiments, the polymeric compatibilizer comprises two block copolymers. The first block copolymer has an aryl alkylene content greater than to equal to 50 weight percent based on the total weight of the first block copolymer. The second block copolymer has an aryl alkylene content less than or equal to 50 weight percent based on the total weight of the second block copolymer. An exemplary combination of block copolymers is a first polyphenylethylene-poly(ethylene/butylene)-polyphenylethylene having a phenylethylene content of 15 weight percent to 45 weight percent, based on the total weight of the block copolymer and a second polyphenylethylene-poly(ethylene-butylene)-polyphenylethylene having a phenylethylene content of 55 weight percent to 70 weight percent, based on the total weight of the block copolymer may be used. Exemplary block copolymers having an aryl alkylene content greater than 50 weight percent are commercially available from Asahi under the trademark TUFTEC and have grade names such as H1043, as well as some grades available under the tradename SEPTON from Kuraray. Exemplary block copolymers having an aryl alkylene content less than 50 weight percent are commercially available from Kraton Polymers under the trademark KRATON and have grade names such as G-1701, G-1702, G-1730, G-1641, G-1650, G-1651, G-1652, G-1657, A-RP6936 and A-RP6935.

In some embodiments, the polymeric compatibilizer comprises a diblock block copolymer and a triblock block copolymer.

In some embodiments the polymeric compatibilizer comprises a block copolymer having an aryl alkylene content greater than or equal to 50 weight percent based on the total weight of the block copolymer.

In some embodiments the block copolymer(s) has a number average molecular weight of 5,000 to 1,000,000 grams per mole (g/mol), as determined by gel permeation chromatography (GPC) using polystyrene standards. Within this range, the number average molecular weight may be at least 10,000 g/mol, or, more specifically, at least 30,000 g/mol, or, even more specifically, at least 45,000 g/mol. Also within this range, the number average molecular weight may preferably be up to 800,000 g/mol, or, more specifically, up to 700,000 g/mol, or, even more specifically, up to 650,000 g/mol.

In some embodiments, the block copolymer or combination of block copolymers has a total aryl alkylene content greater than or equal to 50 weight percent with respect to the total weight of block copolymer.

A polypropylene-polystyrene graft copolymer is herein defined as a graft copolymer having a propylene polymer backbone and one or more styrene polymer grafts.

The propylene polymer material that forms the backbone or substrate of the polypropylene-polystyrene graft copolymer is (a) a homopolymer of propylene; (b) a random copolymer of propylene and an olefin selected from the group consisting of ethylene and $C_4$-$C_{10}$ olefins, provided that, when the olefin is ethylene, the polymerized ethylene content is up to about 10 weight percent, preferably up to about 4 weight percent, and when the olefin is a $C_4$-$C_{10}$ olefin, the polymerized content of the $C_4$-$C_{10}$ olefin is up to about 20 weight percent, preferably up to about 16 weight percent; (c) a random terpolymer of propylene and at least two olefins selected from the group consisting of ethylene and $C_4$-$C_{10}$ alpha-olefins, provided that the polymerized $C_4$-$C_{10}$ alpha-olefin content is up to about 20 weight percent, preferably up to about 16 weight percent, and, when ethylene is one of the olefins, the polymerized ethylene content is up to about 5 weight percent, preferably up to about 4 weight percent; or (d) a homopolymer or random copolymer of propylene which is impact-modified with an ethylene-propylene monomer rubber in the reactor as well as by physical blending, the ethylene-propylene monomer rubber content of the modified polymer being about 5 to about 30 weight percent, and the ethylene content of the rubber being about 7 to about 70 weight percent, and preferably about 10 to about 40 weight percent. The $C_4$-$C_{10}$ olefins include the linear and branched $C_4$-$C_{10}$ alpha-olefins such as, for example, 1-butene, 1-pentene, 3-methyl-1-butene, 4-methyl-1-pentene, 1-hexene, 3,4-dimethyl-1-butene, 1-heptene, 1-octene, 3-methyl-hexene, and the like. Propylene homopolymers and impact-modified propylene homopolymers are preferred propylene polymer materials. Although not preferred, propylene homopolymers and random copolymers impact modified with an ethylene-propylene-diene monomer rubber having a diene content of about 2 to about 8 weight percent also can be used as the propylene polymer material. Suitable dienes include dicyclopentadiene, 1,6-hexadiene, ethylidene norbornene, and the like.

The term "styrene polymer", used in reference to the grafted polymer present on the backbone of propylene polymer material in the polypropylene-polystyrene graft copolymer, denotes (a) homopolymers of styrene or of an alkyl styrene having at least one $C_1$-$C_4$ linear or branched alkyl ring substituent, especially a p-alkyl styrene; (b) copolymers of the (a) monomers with one another in all proportions; and (c) copolymers of at least one (a) monomer with alpha-methyl derivatives thereof, e.g., alpha-methylstyrene, wherein the alpha-methyl derivative constitutes about 1 to about 40% of the weight of the copolymer.

The polypropylene-polystyrene graft copolymer can comprise about 10 to about 90 weight percent of the propylene polymer backbone and about 90 to about 10 weight percent of the styrene polymer graft. Within these ranges, the propylene polymer backbone may account for at least about 20 weight percent, of the total graft copolymer; and the propylene polymer backbone may account for up to about 40 weight percent of the total graft copolymer. Also within these ranges, the styrene polymer graft may account for at least about 50 weight percent, or, more specifically, at least about 60 weight percent, of the total graft copolymer.

The preparation of polypropylene-polystyrene graft copolymers is described, for example, in U.S. Pat. No. 4,990,558 to DeNicola, Jr. et al. Suitable polypropylene-polystyrene graft copolymers are also commercially available as, for example, P1045H1 and P1085H1 from Basell.

The polymeric compatibilizer is present in an amount of 2 to 30 weight percent, with respect to the total weight of the composition. Within this range the polymeric compatibilizer may be present in an amount greater than or equal to 4 weight percent, or, more specifically, greater than or equal to 6 weight percent, or, even more specifically, greater than or equal to 10 wt %, with respect to the total weight of the composition. Also within this range the polymeric compatibilizer may be present in an amount less than or equal to 25, or, more specifically, less than or equal to 20, or, even more specifically, less than or equal to 18 weight percent with respect to the total weight of the composition.

The magnesium dihydroxide (CAS No. 01309-42-8) can have a median particle size of 0.01 to 15 micrometers, or, more specifically, less than or equal to 10 micrometers, or, even more specifically, less than or equal to 5 micrometers. The magnesium dihydroxide can be synthetic or natural. Exemplary natural magnesium dihydroxides include Magseeds N1, N2, and N3 from Konoshima Chemical Co. Ltd. The magnesium dihydroxide may optionally be surface treated. Exemplary surface treatments include fatty acids, silane compounds, polymeric coupling agents and combinations comprising one of the foregoing. Surface treated magnesium dihydroxides are commercially available from, for example, Albemarle Corporation as MAGNIFIN, Kyowa Chemical Industry as KISUMA, Sakai Chemicals Company as MGZ, and Martin Marietta Magnesia Specialties as Magshield™.

The amount of magnesium dihydroxide is 5 to 40 wt % with respect to the total weight of the composition. Within this range the amount of magnesium dihydroxide can be greater than or equal to 7 wt %, or, more specifically, greater than or equal to 8 wt %. Also within this range the amount of magnesium dihydroxide can be less than or equal to 30 wt %, or, more specifically, less than or equal to 25 wt %, or, even more specifically, less than or equal to 20 wt %.

The composition may comprise an optional plasticizer. In one embodiment the plasticizer is substantially free of phosphorous. Exemplary plasticizers include abietates, adipates, alkyl sulfonates, azelates, benzoates, citrates, epoxides, glycol ethers, glycol esters, glutarates, hydrocarbon oils, isobutyrates, oleates, pentaerythritol derivatives, phthalates, esters, polybutenes, ricinoleates, bevacates, sulfonamides, calcium stearate, difuran esters, hydroxybenzoic acid esters, isocyanate adducts, nitriles, siloxane based plasticizers, thioesters, tar based plasticizers and combinations of two or more of the foregoing. The amount of plasticizer is sufficient to impact the desired degree of flexural modulus, tensile elongation or both. Substantially free of phosphorous with regard to the plasticizer is defined as containing less than 0.5 weight percent phosphorous with respect to the total weight of the plasticizer.

Additionally, the composition may optionally also contain various additives, such as antioxidants; fillers and reinforcing agents having an average particle size less than or equal to 10 micrometers, such as, for example, silicates, $TiO_2$, fibers, glass fibers, glass spheres, calcium carbonate, nanoclays, talc, and mica; mold release agents; UV absorbers; stabilizers such as light stabilizers and others; lubricants; plasticizers; pigments; dyes; colorants; anti-static agents; foaming agents; blowing agents; metal deactivators; flame retardant synergists such as zinc borate; and combinations comprising one or more of the foregoing additives.

In some embodiments, the flexible thermoplastic composition is substantially free of phosphorous. Substantially free, as used herein, is defined at containing less than or equal to 0.5 weight percent phosphorous with respect to the entire weight of the composition.

In some embodiments, the flexible thermoplastic composition is substantially free of halogens. Substantially free, as used herein, is defined at containing less than or equal to 0.2 weight percent halogen, or, more specifically less than or equal to 0.05 wt % with respect to the entire weight of the composition.

In some embodiments the flexible thermoplastic composition is substantially free of phosphorous and halogens.

A method for making the thermoplastic composition comprises melt mixing (compounding) the components used to form the thermoplastic composition, typically in a melt mixing device such as an compounding extruder or Banbury mixer. In some embodiments, the poly(arylene ether), polymeric compatibilizer, polyolefin, magnesium hydroxide, and functionalized polyolefin are simultaneously melt mixed. In another embodiment, the poly(arylene ether), polymeric compatibilizer, and optionally a portion of the polyolefin, a portion of the functionalized polyolefin or a portion of both the polyolefin and the functionalized polyolefin are melt mixed to form a first melt mixture. Subsequently, the polyolefin, functionalized polyolefin, combination thereof, or remainder of the polyolefin, functionalized polyolefin or combination thereof is further melt mixed with the first melt mixture to form a second melt mixture. The magnesium hydroxide can be part of the first melt mixture or added to the first melt mixture during the formation of the second melt mixture. Alternatively, the poly(arylene ether) and a portion of the polymeric compatibilizer may be melt mixed to form a first melt mixture and then the polyolefin and the remainder of the polymeric compatibilizer are further melt mixed with the first melt mixture to form a second melt mixture. Again, the magnesium hydroxide can be part of the first melt mixture or added to the first melt mixture during formation of the second melt mixture.

The aforementioned melt mixing processes can be achieved without isolating the first melt mixture or can be achieved by isolating the first melt mixture. One or more melt mixing devices including one or more types of melt mixing devices can be used in these processes. In some embodiments, some components of the thermoplastic composition that forms the covering may be introduced and melt mixed in an extruder used to coat the conductor.

When the polymeric compatibilizer comprises two block copolymers, one having an aryl alkylene content greater than or equal to 50 weight percent and a second one having an aryl alkylene content less than 50 weight percent, the poly(arylene ether) and the block copolymer having an aryl alkylene content greater than or equal to 50 weight percent can be melt mixed to form a first melt mixture and the polyolefin and a block copolymer having an aryl alkylene content less than or equal to 50 weight percent can be melt mixed with the first melt mixture to form a second melt mixture. The magnesium hydroxide can be part of the first melt mixture or added to the first melt mixture during formation of the second melt mixture.

The poly(arylene ether), polymeric compatibilizer, polyolefin, functionalized polyolefin, and magnesium dihydroxide are melt mixed at a temperature greater than or equal to the glass transition temperature of the poly(arylene ether) but less than the degradation temperature of the polyolefin. For example, the poly(arylene ether), polymeric compatibilizer, polyolefin, functional polyolefin and magnesium dihydroxide may be melt mixed at an extruder temperature of 240° C. to 320° C., although brief periods in excess of this range may occur during melt mixing. Within this range, the temperature may be greater than or equal to 250° C., or, more specifically, greater than or equal to 260° C. Also within this range the temperature may be less than or equal to 310° C., or, more specifically, less than or equal to 300° C.

After some or all the components are melt mixed, the molten mixture can be melt filtered through one of more filters having openings with diameters of 20 micrometers to 150 micrometers. Within this range, the openings may have diameters less than or equal to 130 micrometers, or, more specifically, less than or equal to 110 micrometers. Also within this range the openings can have diameters greater than or equal to 30 micrometers, or, more specifically, greater than or equal to 40 micrometers.

Any suitable melt filtration system or device that can remove particulate impurities from the molten mixture may be used. In some embodiments the melt is filtered through a single melt filtration system. Multiple melt filtration systems are also contemplated.

In some embodiments, the filter openings have a maximum diameter that is less than or equal to half of the thickness of the covering that will be applied to the conductor. For example, if the electrical wire has a covering with a thickness of 200 micrometers, the filter openings have a maximum diameter less than or equal to 100 micrometers.

The minimum size of the filter openings is dependent upon a number of variables including the particle size of the magnesium dihydroxide. Smaller filter openings may result in greater pressure on the upstream side of the filter. Accordingly, the filter openings and method of operation must be chosen to prevent unsafe pressure on the upstream side. In addition the use of a filter having filter openings less than 20 micrometers can result in poor flow both upstream and downstream of the filter. Poor flow can extend the residence time for some portions of the melt mixture. Longer residence times can result in the creation or enlargement of particulates in the composition, which, when applied to the conductor, can cause spark leaks.

In some embodiments the melt filtered mixture is passed through a die head and pelletized by either strand pelletization or underwater pelletization. The pelletized material may be packaged, stored and transported. In some embodiments the pellets are packaged into metal foil lined plastic bags, typically polypropylene bags, or metal foil lined paper bags. Substantially all of the air can be evacuated from the pellet filled bags.

In some embodiments, the thermoplastic composition is substantially free of visible particulate impurities. Visible particulates or "black specks" are dark or colored particulates generally visible to the human eye without magnification and having an average diameter of 40 micrometers or greater. Although some people are able to without magnification visually detect particles having an average diameter smaller than 30 micrometers and other people can detect only particles having an average diameter larger than 40 micrometers, the terms "visible particles," "visible particulates," and "black specks" when used herein without reference to a specified average diameter means those particulates having an average diameter of 40 micrometers or greater. As used herein, the term "substantially free of visible particulate impurities" when applied to the thermoplastic composition means that when the composition is injection molded to form 5 plaques having dimensions of 75 millimeters X 50 millimeters and having a thickness of 3 millimeters and the plaques are visually inspected on all sides for black specks with the naked eye the total number of black specks for all five plaques is less than or equal to 100, or, more specifically, less than or equal to 70, or, even more specifically, less than or equal to 50.

As mentioned above, the thermoplastic composition can be used in the covering disposed over the conductor of electrical wires.

In some embodiments the pellets are melted and the composition applied over the conductor by a suitable method such as extrusion coating to form an electrical wire. For example, a coating extruder equipped with a screw, crosshead, breaker plate, distributor, nipple, and die can be used. The melted thermoplastic composition forms a covering disposed over a circumference of the conductor. Extrusion coating may employ a single taper die, a double taper die, other appropriate die or combination of dies to position the conductor centrally and avoid die lip build up.

In some embodiments, the composition is applied to the conductor to form a covering disposed over the conductor. Additional layers may be applied to the covering.

In some embodiments the composition is applied to a conductor having one or more intervening layers between the conductor and the covering to form a covering disposed over the conductor. For instance, an optional adhesion promoting layer may be disposed between the conductor and covering. In another example the conductor may be coated with a metal deactivator prior to applying the covering. In another example the intervening layer comprises a thermoplastic or thermoset composition that, in some cases, is foamed.

The conductor may comprise a single strand or a plurality of strands. In some cases, a plurality of strands may be bundled, twisted, or braided to form a conductor. Additionally, the conductor may have various shapes such as round or oblong. The conductor may be any type of conductor used to transmit a signal. Exemplary signals include optical, electrical, and electromagnetic. Glass fibers are one example of an optical conductor. Suitable electrical conductors include, but are not limited to, copper, aluminum, lead, and alloys comprising one or more of the foregoing metals. The conductor may also be an electrically conductive ink or paste.

The cross-sectional area of the conductor and thickness of the covering may vary and is typically determined by the end use of the electrical wire. The electrical wire can be used as electric wire without limitation, including, for example, for harness wire for automobiles, wire for household electrical appliances, wire for electric power, wire for instruments, wire for information communication, wire for electric cars, as well as ships, airplanes, and the like. In some embodiments the covered conductor is an optical cable and can be used in interior applications (inside a building), exterior applications (outside a building) or both interior and exterior applications. Exemplary applications include data transmission networks and voice transmission networks such as local area networks (LAN) and telephone networks.

In some embodiments it may be useful to dry the thermoplastic composition before extrusion coating. Exemplary drying conditions are 60-90° C. for 2-20 hours. Additionally, in some embodiments, during extrusion coating, the thermoplastic composition is melt filtered, prior to formation of the covering, through one or more filters having opening diameters of 20 micrometers to 150 micrometers. Within this range, the openings diameters may be greater than or equal to 30 micrometers, or more specifically greater than or equal to 40 micrometers. Also within this range the openings diameters may be less than or equal to 130 micrometers, or, more specifically, less than or equal to 110 micrometers. The coating extruder may comprise one or more filters as described above.

In some embodiments, during extrusion coating, the thermoplastic composition is melt filtered, prior to formation of the covering, through one or more filters having openings with a maximum diameter that is less than or equal to half of the thickness of the covering that will be applied to the conductor. For example, if the electrical wire has a covering with a thickness of 200 micrometers, the filter openings have a maximum diameter less than or equal to 100 micrometers.

In some embodiments the melt filtered mixture produced by melt mixing is not pelletized. Rather the molten melt filtered mixture is formed directly into a covering for the conductor using a coating extruder that is in tandem with the melt mixing apparatus, typically a compounding extruder. The coating extruder may comprise one or more filters as described above.

A color concentrate or masterbatch may be added to the composition prior to or during the extrusion coating. When a color concentrate is used it is typically present in an amount less than or equal to 3 weight percent, based on the total weight of the composition. In some embodiments dye and/or pigment employed in the color concentrate is free of chlorine, bromine, and fluorine. As appreciated by one of skill in the art, the color of the composition prior to the addition of color concentrate may impact the final color achieved and in some cases it may be advantageous to employ a bleaching agent and/or color stabilization agents. Bleaching agents and color stabilization agents are known in the art and are commercially available.

The extruder temperature during extrusion coating is generally less than or equal to 320° C., or, more specifically, less than or equal to 310° C., or, more specifically, less than or equal to 290° C. Additionally the processing temperature is adjusted to provide a sufficiently fluid molten composition to afford a covering for the conductor, for example, higher than the melting point of the thermoplastic composition, or more specifically at least 10° C. higher than the melting point of the thermoplastic composition.

After extrusion coating the electrical wire is usually cooled using a water bath, water spray, air jets, or a combination comprising one or more of the foregoing cooling methods. Exemplary water bath temperatures are 20 to 85° C. The water may be de-ionized and may also be filtered to remove impurities. The electrical wire can be checked for spark leaks using an in-line method. An exemplary method of testing for spark leaks comprises using the conductor of the electrical wire as a grounded electrode and passing the electrical wire next to or through a charged electrode such that the electrical wire is in contact with the charged electrode. Exemplary charged electrodes include bead chains and brushes. The electrode may be charged using alternating current or direct current as indicated by the end use of the wire and any relevant industrial specifications for the wire. The voltage may be determined by one of ordinary skill in the art of spark leak testing. The frequency used depends upon the load capacitance and may also be determined by one of ordinary skill in the art of spark leak testing. Spark testing equipment is commercially available from, for example, The Clinton Instrument Company, Beta LaserMike, and Zumbach.

Figure 2:
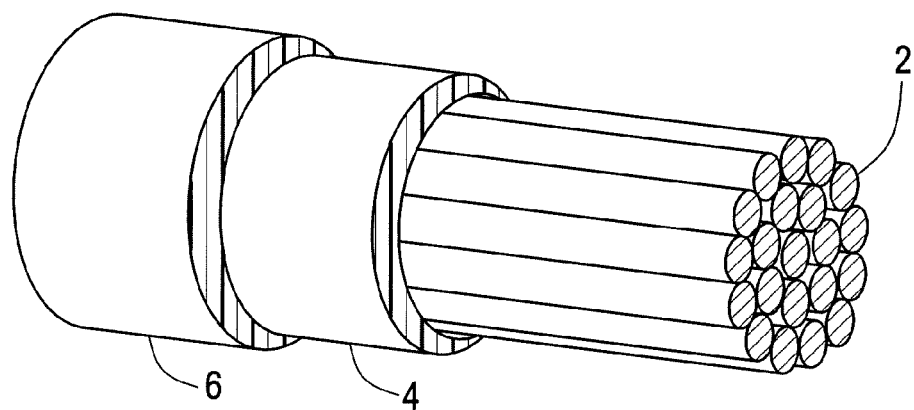
FIGS. 2 and 3 are perspective views of an electrical wire having multiple layers.
Figure 3:
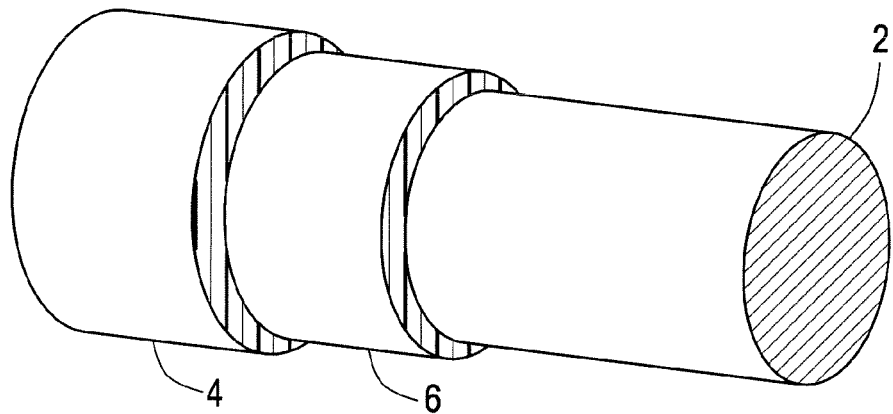

A cross-section of an exemplary electrical wire is seen in FIG. 1. FIG. 1 shows a covering, 4, disposed over a conductor, 2. In some embodiments, the covering, 4, comprises a foamed thermoplastic composition. Perspective views of exemplary electrical wires are shown in FIGS. 2 and 3. FIG. 2 shows a covering, 4, disposed over a conductor, 2, comprising a plurality of strands and an optional additional layer, 6, disposed over the covering, 4, and the conductor, 2. In some embodiments, the covering, 4, comprises a foamed thermoplastic composition. Conductor, 2, can also comprise a unitary conductor. FIG. 3 shows a covering, 4, disposed over a unitary conductor, 2, and an intervening layer, 6. In some embodiments, the intervening layer, 6, comprises a foamed composition. Conductor, 2, can also comprise a plurality of strands.

The composition and electrical wire are further illustrated by the following non-limiting examples.

EXAMPLES

The following examples were prepared using the materials listed in Table 2.

TABLE 2

| Component | Description |
|---|---|
| PPE | A poly(2,6-dimethylphenylene ether) with an intrinsic viscosity of 0.46 dl/g as measured in chloroform at 25° C. commercially available from GE Plastics under the grade name PPO646. |
| HDPE | A high density polyethylene commercially available from Mitsui Chemicals under the grade name HIZEX 5305E. |
| Polyolefin copolymer | Copolymer of ethylene and an alpha olefin commercially available from Mitsui Chemicals under the grade name Tafmer A4090. |
| HDPE MA 1 | A high density polyethylene functionalized with a maleic anhydride commercially available from DuPont under the grade name FUSABOND MB265D. |
| HDPE MA 2 | A high density polyethylene functionalized with a maleic anhydride commercially available from Mitsui Chemicals under the grade name ADMER AT1804. |
| SEBS I | A polyphenylethylene-poly(ethylene/butylene)-polyphenylethylene block copolymer having a phenylethylene content of 40 weight percent, based on the total weight of the block copolymer and commercially available from Asahi Chemical under the grade name Tuftec H1051. |
| SEBS II | A styrene-(ethylene/propylene-styrene)-styrene copolymer commercially available from Kraton Polymers under the grade name RP6936 having a styrene content of 39 weight percent, based on the total weight of the block copolymer. |
| SEBS III | A polyphenylethylene-poly(ethylene/butylene)-polyphenylethylene block copolymer having a phenylethylene content of 67 weight percent, based on the total weight of the block copolymer and commercially available from Asahi Chemical under the grade name Tuftec H1043. |
| $Mg(OH)_2$ 1 | Magnesium dihydroxide available under the tradename KISUMA 5A from Kisuma Chemicals. |
| $Mg(OH)_2$ 2 | Magnesium dihydroxide available under the tradename MAGNIFIN H10 from Albemarle Corp. |
| $Mg(OH)_2$ 3 | A coated magnesium dihydroxide available under the tradename MAGNIFIN H10A from Albemarle Corp. |

TABLE 2-continued

| Component | Description |
|---|---|
| Mg(OH)₂ 4 | A coated magnesium dihydroxide available under the tradename MAGNIFIN H10C from Albemarle Corp. |
| Mg(OH)₂ 5 | A coated magnesium dihydroxide available under the tradename MAGNIFIN H10MV from Albemarle Corp. |
| Mg(OH)₂ 6 | A coated magnesium dihydroxide available under the tradename MZG-3 from Sakai Chemicals. |
| AlO | An aluminum oxide hydrate commercially available from Nabaltec under the tradename APYRAL AOH60 |

Flexural modulus (F/M) was determined using ASTM D790-03 at a speed of 1.27 millimeters per minute and is expressed in kilograms per square centimeter (kg/cm$^2$). The values given are the average of three samples. The samples for flexural modulus were formed using an injection pressure of 600-700 kilograms-force per square centimeter and a hold time of 15 to 20 seconds on a Plastar Ti-80G$_2$ from Toyo Machinery & Metal Co. LTD. The remaining molding conditions are shown in Table 1. Flexural strength (F/S) was determined using ASTM D790-03 at a speed of 2.5 millimeters per minute.

Examples were also tested for Notched Izod (ASTM D256 with 0.9 kilograms (2 pounds)). The Notched Izod samples were 10 millimeters (mm)×10 mm×64 mm in size. The notch was located at the middle of the 64 mm dimension and had an angle of 45 degrees; the radius of the notch base was 0.25 mm. The samples were conditioned at 23° C. and 50% relative humidity prior to testing. Testing was performed at 23° C. and 50% relative humidity. Results are the average of 5 samples and are reported in kilojoules per square meter (kJ/m$^2$).

Examples were tested for tensile strength (T/S) and tensile elongation (T/E) (ASTM D638 with 50 millimeters per minute). The samples were conditioned at 23° C. and 50% relative humidity prior to testing. Testing was performed at 23° C. and 50% relative humidity. Tensile strength and tensile elongation results are the average of 3 samples.

Heat distortion temperature (HDT) was determined using ASTM D648-04 with a loading of 4.6 kilograms. Values are expressed in degrees centigrade (° C.). The samples were conditioned at 23° C. and 50% relative humidity prior to testing. Samples were molded using the same conditions as the samples for flexural modulus. Results are the average of 3 samples.

The thermoplastic compositions were dried at 80° C. for 3-4 hours prior to extrusion with the conductor to form the electrical wires. The conductor was a copper wire with a conductor size of 0.2 square millimeters (mm$^2$). Electrical wires were produced using a line speed of 250 meters per minute. The thermoplastic composition was preheated at 100° C. and extruded onto the conductor at 275° C. The coverings had thicknesses of 0.21 millimeters. The electrical wire was cut into 80 centimeter (cm) lengths and subjected to a flame as described in ISO 6722. The average amount of time (in seconds) required for the sample to extinguish (the average flame out time) is expressed in Table 3 based on 10 samples. The electrical wire was also tested for abrasion resistance using the scrape abrasion specification of ISO 6722 using a 7 Newton load, a needle having a 0.45 millimeter diameters, and an electrical wire having a conductor with a cross sectional area of 0.22 square millimeters and a covering with a thickness of 0.2 millimeters.

Comparative Examples 1-5

Comparative examples 1-5 (C1-C5) were made by melt mixing the HDPE, Mg(OH)₂ and HDPE MA 2 (when present). The HDPE, HDPE MA 2, and Mg(OH)₂ were added at the feed throat of a twin screw extruder. Melt mixing temperature was set at 200° C. The compositions were tested as described above. Results and compositions are shown in Table 3. Composition amounts are based on the total weight of the composition. The results show that the inclusion of the functionalized polyolefin (HDPE MA 2) did not decrease flame out time and in fact increased it.

TABLE 3

|  | C1 | C2 | C3 | C4 | C5 |
|---|---|---|---|---|---|
| HDPE | 60 | 45 | 45 | 35 | 30 |
| Mg(OH)₂ 1 | 40 | 55 | 45 | 55 | 70 |
| HDPE MA 2 | — | — | 10 | 10 | — |
| Izod (kJ/m$^2$) | 37.2 | 23.0 | 207 | 194 | — |
| T/S (Megapascals, Mpa) | 16 | 16 | 21 | 21 | — |
| T/E (%) | 418 | 22 | 241 | 26 | — |
| F/S (MPa) | 24 | 26 | 26 | 29 | — |
| F/M (MPa) | 574 | 820 | 689 | 928 | — |
| HDT (.) | 81 | 91 | 78 | 87 | — |
| Flame out time (seconds, sec) | 181 | 190 | 206 | 223 | * |
| Abrasion resistance (cycles) | 5 | 3 | 46 | 11 | * |

* Wire could not be made using extrusion coating with this composition.

Comparative Examples 6-9 and Examples 1-2

The thermoplastic compositions were made by melt mixing the components in a twin screw extruder with the melt mixing temperature set at 260° C. PPE, SEBS, and Mg(OH)₂ were added at the feed throat, while HDPE and HDPE-MA were added downstream. In example 2 the Mg(OH)₂ was added as part of a masterbatch also comprising the HDPE and the HDPE MA. The melt mixing temperature for making the masterbatch was 200° C. The masterbatch was added as downstream while other components were fed as upstream, and the melt mixing temperature was 260° C. The compositions were tested as described above. Results and compositions are shown in Table 4. Composition amounts are based on the total weight of the composition. Comparative examples 6-9 (C6-C9) show that Mg(OH)₂ alone is insufficient to obtain a flame out time less than 10 seconds. In contrast examples 1 and 2 show that the inclusion of functionalized polyolefin results in a dramatic decrease in flame out time—a decrease of over 96%. Additionally, examples 1 and 2 show an increase in abrasion resistance compared to C6-C9 and abrasion resistance performance is better when a masterbatch is employed in forming the composition.

TABLE 4

|  | C6 | C7 | C8 | C9 | 1 | 2 |
|---|---|---|---|---|---|---|
| PPE | 47 | 47 | 47 | 47 | 47 | 47 |
| HDPE | 25 | 25 | 25 | 25 | 20 | 20 |

TABLE 4-continued

|  | C6 | C7 | C8 | C9 | 1 | 2 |
|---|---|---|---|---|---|---|
| SEBS I | 8 | 8 | 8 | 8 | 8 | 8 |
| Mg(OH)$_2$ 2 | 20 | — | — | — | 20 | 20 |
| Mg(OH)$_2$ 3 | — | 20 | — | — | — | — |
| Mg(OH)$_2$ 4 | — | — | 20 | — | — | — |
| Mg(OH)$_2$ 5 | — | — | — | 20 | — | — |
| HDPE MA 1 | — | — | — | — | 5 | 5 |
| Izod (kJ/m$^2$) | 90 | 95 | 83 | 129 | 159 | 219 |
| T/S (MPa) | 24 | 25 | 25 | 21 | 25 | 27 |
| T/E (%) | 3 | 5 | 4 | 7 | 7 | 7 |
| F/S (MPa) | 37 | 37 | 38 | 36 | 39 | 42 |
| F/M (MPa) | 1276 | 1220 | 1325 | 1352 | 1283 | 1332 |
| HDT (.) | 128 | 128 | 130 | 134 | 133 | 149 |
| Flame out time (sec) | 67.7 | 119.1 | 63.8 | 30.8 | 2.1 | 2.1 |
| Abrasion resistance (cycles) | 534 | 477 | 456 | 308 | 778 | 937 |

Examples 3-5

The thermoplastic compositions were made by melt mixing the components in a twin screw extruder with the melt mixing temperature set at 260° C. PPE, SEBS, Mg(OH)$_2$ were added at the feed throat, while HDPE and HDPE-MA were added downstream. The compositions were tested as described above. Results and compositions are shown in Table 5. Composition amounts are based on the total weight of the composition. Examples 3 and 4 show that similar flame out times are obtained regardless of the type of functionalized HDPE that was used. In addition, Example 5 shows that a similar flame out time can be achieved with less magnesium dihydroxide.

TABLE 5

|  | 3 | 4 | 5 |
|---|---|---|---|
| PPE | 47 | 47 | 52 |
| HDPE | 20 | 20 | 20 |
| SEBS I | 8 | 8 | 8 |
| Mg(OH)$_2$ 2 | 20 | 20 |  |
| Mg(OH)$_2$ 6 |  |  | 15 |
| HDPE MA 1 | 5 |  | 5 |
| HDPE MA 2 |  | 5 |  |
| Izod (kJ/m$^2$) | 159 | 205 | 179 |
| T/S (MPa) | 25 | 28 | 29 |
| T/E (%) | 7 | 12 | 9 |
| F/S (MPa) | 39 | 41 | 43 |
| F/M (MPa) | 1283 | 1242 | 1328 |
| HDT (.) | 133 | 134 | 162 |
| Flame out time (sec) | 2.1 | 2.1 | 2.1 |
| Abrasion resistance (cycles) | 778 |  | 1105 |

Examples 6-9

The thermoplastic compositions were made by melt mixing the components in a twin screw extruder with the melt mixing temperature set at 260° C. PPE, SEBS, Mg(OH)$_2$ were added at the feed throat, while HDPE and HDPE-MA were added downstream. The compositions were tested as described above. Results and compositions are shown in Table 6. Composition amounts are based on the total weight of the composition. The compositions show that robust flame retardance is obtained with varying amounts of poly(arylene ether), functionalized polyolefin, and magnesium dihydroxide.

TABLE 6

|  | 6 | 7 | 8 | 9 |
|---|---|---|---|---|
| PPE | 41 | 35 | 52 | 47 |
| HDPE | 20 | 20 | 20 | 15 |
| HDPE MA 2 | 5 | 5 | 5 | 10 |
| SEBS I | 8 | 8 | 8 | 8 |
| Mg(OH)$_2$ 1 | 26 | 32 | 15 | 20 |
| Izod (J/m) | 601 | 394 | 818 | 794 |
| T/S (MPa) | 30 | 27 | 35 | 34 |
| T/E (%) | 13 | 11 | 18 | 20 |
| F/S (MPa) | 45 | 42 | 51 | 48 |
| F/M (MPa) | 1463 | 1438 | 1507 | 1409 |
| HDT (.) | 163 | 144 | 181 | 181 |
| Flame out time (sec) | 1.5 | 2.1 | 2.1 | 2.2 |
| Abrasion (cycles) | 310 | 291 | 852 | 339 |

Comparative Example 10 and Examples 10-13

The thermoplastic compositions were made by melt mixing the components in a twin screw extruder with the melt mixing temperature set at 260° C. PPE, SEBS, Mg(OH)$_2$ were added at the feed throat, while HDPE and HDPE-MA were added downstream. The compositions were tested as described above. Results and compositions are shown in Table 7. Composition amounts are based on the total weight of the composition. The amount of functionalized polyolefin in relationship to the combined amount of polyolefin and functionalized polyolefin was varied. Examples 10-13 show that good flame retardance can be achieved when the amount of functionalized polyolefin is 8 percent of the total polyolefin and when the amount of functionalized polyolefin is 100 percent of the total polyolefin.

TABLE 7

|  | C10 | 10 | 11 | 12 | 13 |
|---|---|---|---|---|---|
| PPE | 47 | 47 | 47 | 47 | 47 |
| HDPE | 25 | 23 | 20 | 15 |  |
| HDPE MA 2 | — | 2 | 5 | 10 | 25 |
| SEBS I | 8 | 8 | 8 | 8 | 8 |
| Mg(OH)$_2$ 1 | 20 | 20 | 20 | 20 | 20 |
| PO – MA/(PO + PO – MA) (%) | 0 | 8 | 20 | 40 | 100 |
| Izod (J/m) | 179 | 227 | 159 | 794 | 195 |
| T/S (MPa) | 23 | 26 | 25 | 34 | 31 |
| T/E (%) | 6 | 19 | 7 | 20 | 5 |
| F/S (MPa) | 37 | 42 | 39 | 48 | 50 |
| F/M (MPa) | 1252 | 1294 | 1283 | 1409 | 1453 |
| HDT (.) | 133 | 144 | 133 | 181 | 188 |
| Flame out time (sec) | 18.1 | 2.3 | 2.1 | 2.2 | 1.9 |

Examples 14-19

The thermoplastic compositions were made by melt mixing the components in a twin screw extruder with the melt mixing temperature set at 260° C. PPE, SEBS, Mg(OH)$_2$ 1 were added at the feed throat, while HDPE and HDPE-MA were added downstream. The compositions were tested as described above. Results and compositions are shown in Table 8. Composition amounts are based on the total weight of the composition. The compositions show that robust flame retardance is obtained with varying amounts of poly(arylene ether), block copolymer, polyolefin, functionalized polyolefin, and magnesium dihydroxide as well as varying the polyolefin type.

TABLE 8

|  | 14 | 15 | 16 | 17 | 18 | 19 |
|---|---|---|---|---|---|---|
| PPE | 47 | 47 | 50 | 50 | 50 | 50 |
| HDPE | 20 | — | 15 | 20 | 10 | 5 |
| Polyolefin copolymer | — | 20 | — | — | 10 | 15 |
| HDPE MA 2 | 5 | 5 | 10 | 5 | 5 | 5 |
| SEBS II | 8 | 8 | 10 | 10 | 10 | 10 |
| SEBS III | 5 | 5 | 5 | 5 | 5 | 5 |
| Mg(OH)$_2$ 1 | 15 | 15 | 10 | 10 | 10 | 10 |
| Izod (J/m) | 179 | 345 | 200 | 162 | 272 | 302 |
| T/S (MPa) | 25 | 24 | 26 | 25 | 25 | 24 |
| T/E (%) | 17 | 68 | 23 | 26 | 52 | 62 |
| F/S (MPa) | 35 | 25 | 35 | 32 | 27 | 25 |
| F/M (MPa) | 887 | 496 | 907 | 783 | 607 | 504 |
| HDT (.) | — | — | 142 | 129 | 126 | 129 |
| Flame out time (sec) | 3.0 | 2.5 | 2.0 | 2.6 | 2.7 | 3.0 |

Comparative Examples 11-14

The thermoplastic compositions were made by melt mixing the components in a twin screw extruder with the melt mixing temperature set at 260° C. PPE, SEBS, and AlO were added at feed throat, while HDPE and HDPE-MA were added downstream. The compositions were tested as described above. Results and compositions are shown in Table 9. Composition amounts are based on the total weight of the composition. Comparative examples 11-14 (C11-C14) use aluminum oxide hydrate in place of magnesium dihydroxide. In contrast to the examples containing magnesium dihydroxide the examples containing aluminum oxide hydrate show no difference in flame retardance based on the absence or presence of a functionalized polyolefin.

TABLE 9

|  | C11 | C12 | C13 | C14 |
|---|---|---|---|---|
| PPE | 52 | 52 | 47 | 47 |
| HDPE | 25 | 20 | 25 | 20 |
| HDPE MA 2 | — | 5 | — | 5 |
| SEBS I | 8 | 8 | 8 | 8 |
| AlO | 15 | 15 | 20 | 20 |
| Izod (J/m) | 162 | 272 | 130 | 130 |
| T/S (MPa) | 29 | 26 | 25 | 27 |
| T/E (%) | 22 | 35 | 26 | 23 |
| F/S (MPa) | 41 | 37 | 35 | 41 |
| F/M (MPa) | 1216 | 1002 | 1006 | 1234 |
| HDT (.) | 146 | 129 | 127 | 141 |
| Flame out time (sec) | 31 | 146 | 2.5 | 2.6 |

In this specification and in the claims, which follow, reference will be made to a number of terms which shall be defined to have the following meanings. The terms "a" and "an" herein do not denote a limitation of quantity, but rather denote the presence of at least one of the referenced item. "Optional" or "optionally" means that the subsequently described event or circumstance may or may not occur, and that the description includes instances where the event occurs and instances where it does not. All ranges disclosed herein are inclusive and combinable (e.g., ranges of "up to 25 wt %, or, more specifically, 5 wt % to 20 wt %," is inclusive of the endpoints and all intermediate values of the ranges of "5 wt % to 25 wt %," etc.). The suffix "(s)" as used herein is intended to include both the singular and the plural of the term that it modifies, thereby including one or more of that term (e.g., the sample(s) includes one or more samples). Reference throughout the specification to "one embodiment", "another embodiment", "an embodiment", "some embodiments", and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments. ISO 6722, as referred to herein, is the Dec. 15, 2002 version of this standard.

While the invention has been described with reference to a several embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A flexible thermoplastic composition consisting essentially of:
   (i) a poly(arylene ether);
   (ii) a first polyolefin selected from the group consisting of polyolefin copolymers, high density polyethylenes and combinations thereof;
   (iii) a block copolymer comprising at least one block (A) comprising repeating aryl alkylene units and at least one block (B) comprising repeating alkylene units;
   (iv) a high density polyethylene comprising an acid anhydride functional group;
   (v) 8 to 40 weight percent of magnesium dihydroxide, based on the total weight of the composition, and
   (iv) an optional plasticizer, optional additive, or combination of two or more of the foregoing optional components wherein the composition comprises a continuous polyolefin phase, the combined polyolefin is present in an amount of 15 to 30 weight percent, based on the total weight of the composition, and the high density polyethylene comprising an acid anhydride functional group is present in an amount of 5 to 95 weight percent, relative to the combined amount of polyolefin.

2. The composition of claim 1, wherein the composition is essentially free of an alkenyl aromatic resin.

3. The composition of claim 1, wherein the poly(arylene ether) is present in an amount of 25 to 60 weight percent, with respect to the total weight of the composition.

4. The composition of claim 1, wherein the combined amount of first polyolefin and high density polyethylene comprising an acid anhydride functional group is less than the amount of poly(arylene ether) by weight.

5. The composition of claim 1, wherein the first polyolefin is a high density polyethylene and the high density polyethylene comprising an acid anhydride functional group is a high density polyethylene functionalized with maleic anhydride.

6. The composition of claim 1, wherein the block copolymer comprises two block copolymers.

7. The composition of claim 6, wherein the block copolymers have a combined amount of 2 to 30 weight percent, with respect to the total weight of the composition.

8. The composition of claim 1, wherein the block copolymer comprises a block that is controlled distribution copolymer.

9. The composition of claim 1, wherein the magnesium dihydroxide has a median particle size of 0.01 to 15 micrometers.

10. The composition of claim 1, wherein the magnesium dihydroxide is present in an amount of 5 to 40 weight percent with respect to the total weight of the composition.

11. The composition of claim 1, wherein the composition comprises a plasticizer.

12. The composition of claim 1, wherein the composition has a flexural modulus of 2,000 to less than 18,000 kilograms per square centimeter as determined by ASTM D790-03.

13. A flexible thermoplastic composition comprising:
   (i) 45 to 55 weight percent of a poly(arylene ether), based on the total weight of the composition;
   (ii) a first polyolefin selected from the group consisting of polyolefin copolymers, high density polyethylenes and combinations thereof;
   (iii) 10 to 20 weight percent of a combination of block copolymers, based on the total weight of the composition, wherein each block copolymer comprises at least one block (A) comprising repeating aryl alkylene units and at least one block (B) comprising repeating alkylene units;
   (iv) a high density polyethylene comprising an acid anhydride functional group; and
   (v) 5 to 20 weight percent of magnesium dihydroxide, based on the total weight of the composition,
   wherein the combined weight of the first polyolefin and the high density polyethylene comprising an acid anhydride functional group is 15 to 30 weight percent, based on the total weight of the composition, and wherein the composition comprises a continuous polyolefin phase, and the high density polyethylene comprising an acid anhydride functional group is present in an amount of 5 to 95 weight percent, relative to the combined amount of polyolefin.

14. A thermoplastic composition consisting essentially of:
   (i) a poly(arylene ether);
   (ii) a high density polyethylene;
   (iii) a polyolefin block copolymer;
   (iv) a high density polyethylene comprising an acid anhydride functional group
   (v) a block copolymer comprising at least one block (A) comprising repeating aryl alkylene units and at least one block (B) comprising repeating alkylene units; and
   (v) 8 to 40 weight percent of magnesium dihydroxide, based on the total weight of the composition, and
   (vi) an optional plasticizer, optional additive, or combination of the foregoing optional components wherein the composition comprises a continuous polyolefin phase, the combined polyolefin is present in an amount of 15 to 30 weight percent, based on the total weight of the composition, and the high density polyethylene comprising an acid anhydride functional group is present in an amount of 5 to 95 weight percent, relative to the combined amount of polyolefin.

15. An electrical wire comprising:
   a conductor; and
   a covering disposed over the conductor,
   wherein the covering comprises a thermoplastic composition, and
   the thermoplastic composition comprises
   (i) a poly(arylene ether);
   (ii) a first polyolefin selected from the group consisting of polyolefin copolymers, high density polyethylenes and combinations thereof;
   (iii) a block copolymer comprising at least one block (A) comprising repeating aryl alkylene units and at least one block (B) comprising repeating alkylene units;
   (iv) a high density polyethylene comprising an acid anhydride functional group; and
   (iv) 8 to 40 weight percent of magnesium dihydroxide, wherein the composition comprises a continuous polyolefin phase, the combined polyolefin is present in an amount of 15 to 30 weight percent, based on the total weight of the composition, and the high density polyethylene comprising an acid anhydride functional group is present in an amount of 5 to 95 weight percent, relative to the combined amount of polyolefin.

16. The electrical wire of claim 15, wherein the composition is essentially free of an alkenyl aromatic resin.

17. The electrical wire of claim 15, wherein the poly (arylene ether) is present in an amount of 25 to 60 weight percent, with respect to the total weight of the composition.

18. The electrical wire of claim 15, wherein the combined amount of first polyolefin and high density polyethylene comprising an acid anhydride functional group is less than the amount of poly(arylene ether) by weight.

19. The electrical wire of claim 15, wherein the first polyolefin is a high density polyethylene and the high density polyethylene comprising an acid anhydride functional group is a high density polyethylene functionalized with maleic anhydride.

20. The electrical wire of claim 15, wherein the block copolymer comprises a two block copolymers.

21. The electrical wire of claim 20, wherein the block copolymers have a combined amount of 2 to 30 weight percent, with respect to the total weight of the composition.

22. The electrical wire of claim 15, wherein the block copolymer comprises a block that is a controlled distribution copolymer.

23. The electrical wire of claim 15, wherein the magnesium dihydroxide has a median particle size of 0.01 to 15 micrometers.

24. The electrical wire of claim 15, wherein the composition further comprises a plasticizer.

25. An electrical wire comprising:
   a conductor; and
   a covering disposed over the conductor,
   wherein the covering comprises a thermoplastic composition, and
   the thermoplastic composition comprises
   (i) 45 to 55 weight percent of a poly(arylene ether), based on the total weight of the composition;
   (ii) a first polyolefin selected from the group consisting of polyolefin copolymers, high density polyethylenes and combinations thereof;
   (iii) 10 to 20 weight percent of a combination of block copolymers based on the total weight of the composition, wherein each block copolymer comprises at least one block (A) comprising repeating aryl alkylene units and at least one block (B) comprising repeating alkylene units;
   (iv) a high density polyethylene comprising an acid anhydride functional group; and
   (v) 5 to 20 weight percent magnesium dihydroxide, based on the total weight of the composition,
   wherein the combined polyolefin is present in an amount of 15 to 30 weight percent, based on the total weight of the composition, and wherein the composition comprises a continuous polyolefin phase, and the high density polyethylene comprising an acid anhydride functional group is present in an amount of 5 to 95 weight percent, relative to the combined amount of polyolefin.

26. An electrical wire comprising:
a conductor; and
a covering disposed over the conductor,
wherein the covering comprises a thermoplastic composition, and
the thermoplastic composition comprises
(i) a poly(arylene ether);
(ii) a high density polyethylene;
(iii) a polyolefin block copolymer;
(iv) a high density polyethylene comprising an acid anhydride functional group
(v) a block copolymer comprising at least one block (A) comprising repeating aryl alkylene units and at least one block (B) comprising repeating alkylene units; and
(v) 8 to 40 weight percent of magnesium dihydroxide, based on the total weight of the composition,
wherein the composition comprises a continuous polyolefin phase, the combined polyolefin is present in an amount of 15 to 30 weight percent, based on the total weight of the composition, and the high density polyethylene comprising an acid anhydride functional group is present in an amount of 5 to 95 weight percent, relative to the combined amount of polyolefin.

* * * * *